March 20, 1928.
R. MACK
1,663,137
ELECTRIC SPOT WELDING MACHINE
Filed Feb. 20, 1925 2 Sheets-Sheet 1
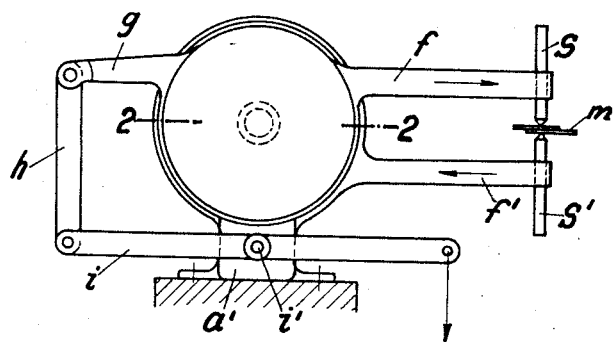
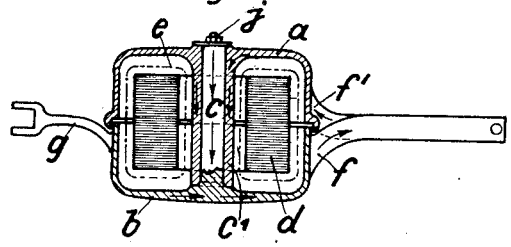
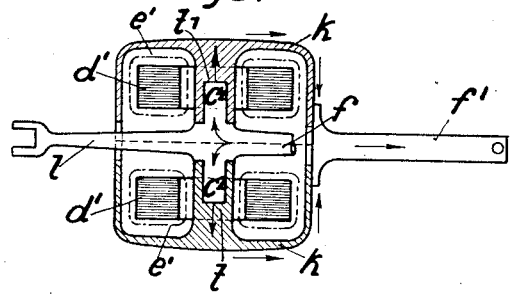
Inventor:
Richard Mack
by Cooper Kerr and Dunham
his Attorneys.

March 20, 1928.

R. MACK 1,663,137

ELECTRIC SPOT WELDING MACHINE

Filed Feb. 20, 1925

Inventor
Richard Mack
by Cooper Kerr & Dunham
his Attorneys.

Patented Mar. 20, 1928.

1,663,137

UNITED STATES PATENT OFFICE.

RICHARD MACK, OF BERLIN-TEMPELHOF, GERMANY.

ELECTRIC SPOT-WELDING MACHINE.

Application filed February 20, 1925, Serial No. 10,512, and in Germany February 28, 1924.

My invention relates to electric welding machines of the resistance type wherein the one electrode or pole of the secondary winding is movable for the purpose of pressing the blank, and more particularly to a machine of the spot-welding or blunt edge or end welding character.

The main object of my invention is to provide a machine of the stated kind which will be of simple construction thereby saving material and reducing the cost of manufacture while at the same time the weight of the machine will be reduced and a more compact structure will be obtained.

With this object in view I construct and arrange the portion of the secondary winding surrounded or enclosed by the pack of laminated sheets of the transformer, to constitute a sliding or rocking bearing for the movable part of the secondary conductor which, as above stated, is utilized for pressing the blank. In this way I mount the bearing within the transformer whereas in machines hitherto constructed or suggested the bearing is mounted on the top of the transformer casing. It will thus be seen that owing to my improved construction the height or vertical extension of the machine is considerably reduced.

Another feature of my invention resides in constructing and arranging the secondary winding to form two half-casings or cups adapted to be displaced relatively to one another and to enclose the primary winding and the laminated sheet pack of the transformer, the one half-casing being provided with a bearing pin, the other half-casing being equipped with a corresponding sleeve so that by having the pin engaged in the sleeve the two half-casings will be assembled to constitute in their totality a casing comprising two halves which can be displaced at will about the common axis or pin. In this way I ensure a further reduction of the size of the machine so as to obtain a small machine of highly compact construction. Both the pin and the sleeve co-operating therewith may be made integral with their half-casings respectively.

A still further feature of my invention lies in rigidly connecting or integrating certain outer conducting means, such as the electrode arms, with the two casings, the said electrode arms serving at the same time to import a pressure to the work in order to bring the welding surface into sufficiently close contact. This feature greatly reduces the size, the weight and consequently the cost of the machine the more so since the latter thus is composed of a minimum of single parts.

Furthermore, in some cases I modify the construction of the machine by locating and arranging the movable welding arm carrying the one secondary electrode, in the middle of the machine, i. e. intermediate between the two half-casings or cups. In this modification the two half-casings or cups are adapted to receive each a part transformer and may be stationary or immovable themselves. Also such a modification affords all and any of the advantages aforestated.

With the above recited objects or features in view the invention resides in the novel construction set forth in the following specification, particularly pointed out in the appended claims and illustrated in the accompanying drawings, it being understood that the right is reserved to embodiments other than those illustrated herein to the full extent indicated by the general meaning of the terms in which the claims are expressed.

In the accompanying drawings forming a part of this specification Figure 1 shows diagrammatically in side elevation, a spot-welding machine constructed according to my invention;

Figure 2 is a horizontal section taken on the line 2—2 of Figure 1 showing that the machine comprises a single transformer only;

Figure 3 is a similar sectional view of a like machine comprising two transformers;

Figure 4:
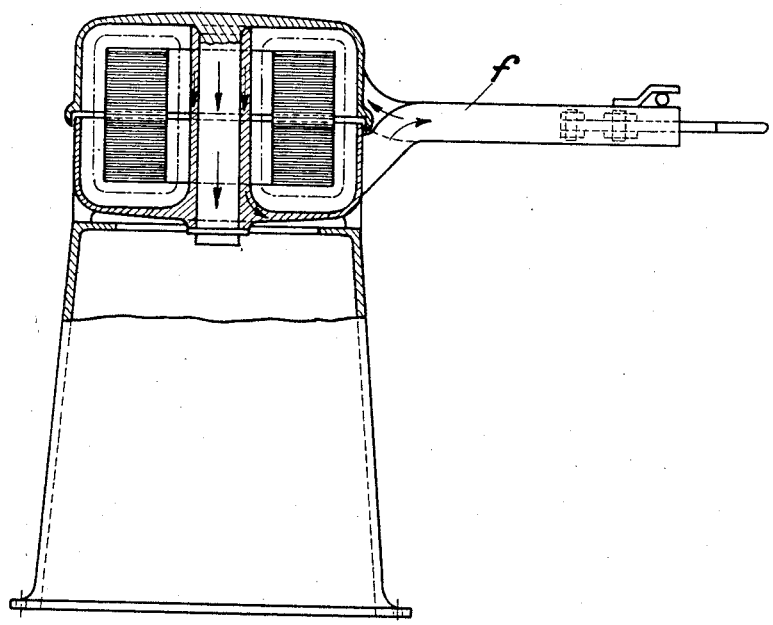
Figure 4 is a vertical section of a machine according to my invention for blunt-edge or end welding purposes and Figure 5 is a plan of the latter.

Referring to the embodiment shown in Figures 1 and 2 the two cup-shaped casings $a$ and $b$ constitute, if assembled as shown, the casing of the transformer and the secondary conductors. From the bottom of the cup $b$ a pin $c$ projects horizontally and a sleeve $c'$ projects horizontally from the bottom of the cup $a$ said sleeve being adapted to snugly fit on the pin $c$ when the parts are assembled as shown. The laminations $d$ of the transformer are mounted to surround the sleeve $c'$. The primary winding of the transformer is indicated at e. The one cup or half-casing, say a, is duly supported by a pedestal a'. The free end of the pin c projects a little beyond the outer bottom face of the cup a to receive a washer and a nut j for securing the two cups a and b in assembled position while at the same time allowing the cup b to be rotated or oscillated with relation to the stationary cup a.

Each cup is firmly connected with an electrode arm f or f' respectively. In the embodiment shown in Figures 1 and 2 the two arms f and f' are formed integral with the respective cup by casting. In opposite direction to the arm f and cup b has another arm or bracket g which likewise may be cast integral therewith. A lever i fulcrumed at a point i' of the pedestal a' is connected with the arm or bracket g by means of a link h. By pulling the free end of the lever i downwards, as indicated in Figure 1 by an arrow, the electrode arm f will be lowered to approach the stationary electrode arms f' and the two electrodes s and s' carried by the two arms will also approach each other until they come in contact with the work m, as shown in Figure 1. By thus pulling the lever i down the two electrodes are caused to exercise a powerful grip on the work at the welding spot, while at the same time the welding operation is effected. By raising the lever i in opposite direction to that indicated by the arrow the two arms f and f' and the electrodes s and s' are separated and recede from each other to receive a blank for a next welding operation.

In the embodiment illustrated in Figure 3 the transformer is divided to form two separate parts and the upper electrodes arm f is mounted midway between the two sets of laminations d'. The lower arm f' is rigidly connected or integral with the divided casing k which is always at rest or, in other words, does not partake, neither totally nor partially, in the movements of the arm f. Two studs t and t' project from opposed inner walls of the casing and the inner free ends of the two studs are bored to form bearing seats for the journals or pins c² of the arm f. The two studs t, t' are cast in one with the halves of the casing and penetrate into or project through the laminated sheet packs d' of the parts of the transformer. In this manner the arm f is duly journalled in the two studs and adapted to swing about the axis of the studs, when the arm l which is identical, as regards its function, with the arm g shown in Figures 1 and 2, is moved up or down, preferably with the aid of means similar to those shown in Figure 1 for the purpose. Also in the embodiment illustrated in Figure 3 the casing serves as a secondary winding, while the primary windings are indicated at e' in Figure 3.

Figure 5:
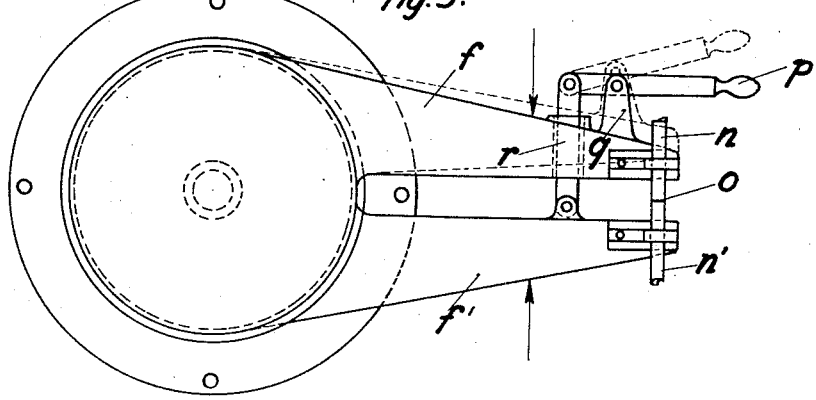

In the modification, shown in Figures 4 and 5 the principle of construction is the very same as in the embodiments herein before explained, the difference lying solely in the fact that the whole machine is, so to speak, turned for 90° so that the two electrode arms f and f' are located in a horizontal plane and the movable arm f, therefore, is adapted to move towards and from the stationary arm f' in such horizontal plane. This arrangement renders the machine particularly fit for blunt edge or end-welding purposes.

In this modification the two work pieces n and n' to be welded together are firmly secured by clamping or any other appropriate means in the free ends of the two electrode arms f and f' respectively, as will be readily understood from an inspection of Figure 5 wherein the two arrows indicate the directions of the movement of the two arms f, f' towards one another. The means for moving the arm f comprise a lateral bracket or arm q rigidly connected or integral with the arm f, a hand lever p fulcrumed in the arm q and a link r pivotally attached to the lever p and to the stationary arm f. The movable arm f has a transverse bore which is wide enough for the link to pass therethrough without touching the sides of said bore and consequently with no friction. Normally the movable parts adopt the positions shown in Figure 5 in dotted lines, but when two work pieces n and n' are properly inserted and fixed in the two arm, f and f' in order to be united by the welding process, the hand lever p is to be moved by the operator into the position shown in full lines whereby the movable arm f is likewise moved into the position shown in full lines and the work piece n is brought into blunt end contact with the other piece n'. As soon as the contact of the work pieces n and n' is sufficiently intimate owing to the pressure exercised by the operator on the hand lever p a homogeneous weld between the two bodies of the work operated upon is produced and the two bodies become integrally one body.

I am aware that minor changes in the arrangement, construction, and combination of the several parts of my improved machine or device can be made and substituted for those herein shown and described without in the least departing from the nature and principle of my invention.

What I claim is:—

1. Electric welding machine, comprising a transformer with a primary and a secondary winding, a stationary electrode arm, a movable electrode arm adapted to be moved toward and away from the stationary electrode arm, and a central member surrounded by the laminations of the said transformer, the said movable electrode arm being pivotally supported by said central member.

2. Electric welding machine, comprising a transformer with a primary and a secondary winding, two cups movable relatively to each other and enclosing the primary winding and the laminations of the said transformer, said cups forming the secondary winding of the transformer.

3. Electric welding machine, comprising a transformer with a primary and a secondary winding, two cups movable relatively to each other and enclosing the primary winding and the laminations of the said transformer, a bearing pin rigidly and conductively connected with the one cup, and a bearing sleeve rigidly and conductively connected with the other cup and co-operating with the said pin, said cups with said pin and sleeve forming the secondary winding of the transformer, each cup being rigidly connected with one electrode arm.

4. Electric welding machine, comprising a transformer with a primary and a secondary winding, two cups rockable relatively to each other and enclosing the primary winding and the laminations of the said transformer, a bearing pin rigidly and conductively connected with the one of the said two cups, a bearing sleeve rigidly and conductively connected with the other cup and cooperating with the said pin as a layer for the rocking movement of one of the two cups, a stationary electrode arm rigidly connected with the stationary cup and a movable electrode arm rigidly connected with the rockable cup, said cups with said pin and sleeve and electrode arms forming the secondary winding.

5. Electric welding machine, comprising a transformer with a primary and a secondary winding, two cups rockable relatively to each other and enclosing the primary winding and the laminations of the said transformer a bearing pin rigidly and conductively connected with the one of the said two cups, a bearing sleeve rigidly and conductively connected with the other cup and cooperating with the said pin a pivotal connection for the rocking movement of one of the two cups, a stationary electrode arm rigidly connected with the stationary cup and a movable electrode arm rigidly connected with the rockable cup, said cups with said pin and sleeve and electrode arms forming the secondary winding and an arm fastened to the movable cup and operable by a suitable leverage.

6. Electric welding machine, comprising a transformer with a primary and a secondary winding, two cups rockable relatively to each other and enclosing the primary winding and the laminations of the said transformer a bearing pin rigidly and conductively connected with the one of the said two cups, a bearing sleeve rigidly and conductively connected with the other cup and cooperating with the said pin a pivotal connection for the rocking movement of one of the two cups, a stationary electrode arm rigidly connected with the stationary cup and a movable electrode arm rigidly connected with the rockable cup, said cups with said pin and sleeve and electrode arms forming the secondary winding, the electrode arms being operatively connected with each other by a suitable leverage.

In testimony whereof I have signed my name to this specification.

RICHARD MACK.